Oct. 2, 1962     A. M. BROWN     3,056,408
LIGATURE CLIP
Filed April 22, 1959
FIG. 1
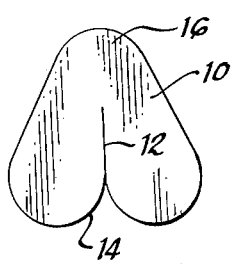
FIG. 2
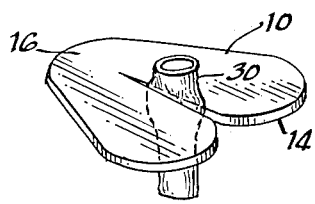
FIG. 3
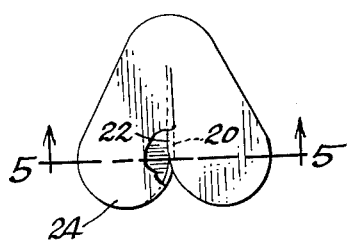
FIG. 4
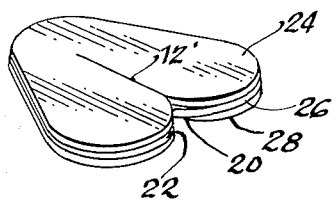
FIG. 5
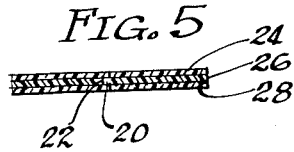
FIG. 6
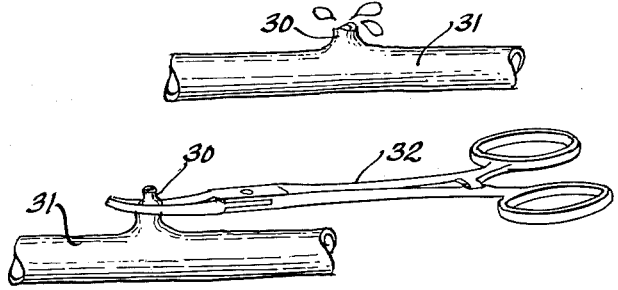
FIG. 7
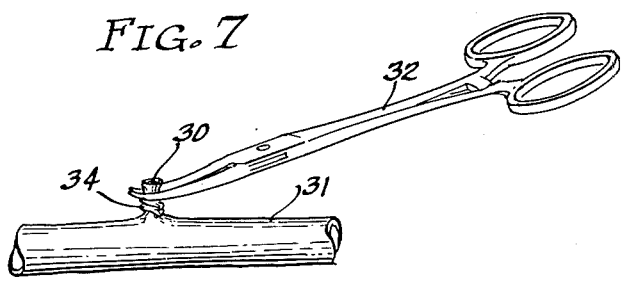
FIG. 8
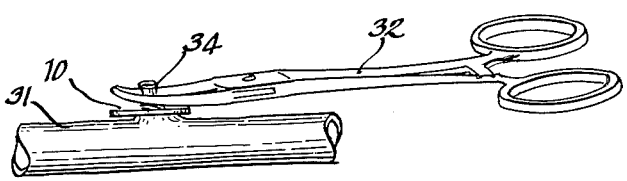
FIG. 9
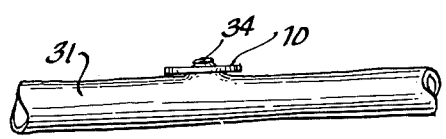
FIG. 10
INVENTOR.
Adolph M. Brown
BY
Oones, McDougall, Williams & Hersh
Attorneys

United States Patent Office 3,056,408
Patented Oct. 2, 1962

3,056,408
LIGATURE CLIP
Adolph M. Brown, 9735 Wilshire Blvd.,
Beverly Hills, Calif.
Filed Apr. 22, 1959, Ser. No. 808,069
2 Claims. (Cl. 128—325)

This invention relates to the ligation of blood vessels in surgery, and it relates more particularly to a means for ligating a blood vessel whereby the amount of time required to achieve strangulation of the vessel and stop bleeding is greatly reduced.

To the present, strangulation is effected by tying the blood vessel with a ligature in the form of an elongate cord which is cut to length and knotted about the vessel. This operation requires the use of at least three hands, one to hold the hemostat, and two to slip the cord-ligature around the vessel and tie knots and to cut the free ends. Considerable time and effort is taken up in looping the cord and tightly knotting the cord about the vessel. In the interim, considerable loss of blood may occur, thereby materially to influence the course of the operation.

Obviously it would be beneficial materially to reduce the time required to ligate a blood vessel in surgery or the like, and it is an object of this invention to produce a means for ligating whereby the time required for strangulation of the vessel to stop bleeding is greatly reduced.

More specifically, it is an object of this invention to produce a ligature clip which can be easily and quickly inserted into a position of use for strangulation of a blood vessel immediately to stop the bleeding thereof.

These and other objects and advantages of this invention will hereinafter appear and for purposes of illustration, but not of limitation, embodiments of the invention are shown in the accompanying drawings, in which:

FIGURE 1 is a top plan view of a ligature clip embodying the features of this invention;

FIGURE 2 is a perspective view of the ligature clip of FIGURE 1 in position of use to strangulate a blood vessel;

FIGURE 3 is a top plan view, with a portion broken away, illustrating a modified form of a ligature clip;

FIGURE 4 is a perspective view of the ligature clip shown in FIGURE 3;

FIGURE 5 is a sectional view taken along the line 5—5 of FIGURE 3;

FIGURE 6 is a perspective view of a bleeding vessel;

FIGURE 7 is a perspective view of a means for grasping the vessel to stop bleeding;

FIGURE 8 is a perspective view similar to that of FIGURE 7, showing the blood vessel twisted in preparation for the insertion of the ligature clip;

FIGURE 9 is a perspective view similar to that of FIGURES 7 and 8, showing the insertion of the clip onto the twisted vessel; and FIGURE 10 is a perspective view of the vessel strangulated with the ligature clip in the position of use.

In accordance with the practice of this invention, strangulation to stop bleeding is effected by the use of a clip in the form of a thin, flat disc member 10 constructed of a relatively rigid but resilient material which is capable of being slowly but ultimately substantially entirely absorbed or dissolved, by the fluids existing in the body or area in which it is confined. The disc is fabricated with a slit 12 extending lengthwise through the major portion of its length to an outwardly flared portion 14 in the forward edge to provide an entrant portion leading into the slit.

While the split disc member may be formed to various shapes, it is preferred to construct the disc to a triangular shape, with the slit 12 extending inwardly from the central portion of one side towards the opposite angular portion 16 with the corners rounded to provide a unit which is heart-shaped in appearance. It will be understood that the split disc may be formed to various other shapes, such as rectangular, square, round, oval or the like, with or without corrugations in the surface or a thickened or beaded edge to impart strengthening and stiffening characteristics.

The split disc can be fabricated of such materials as gelatin reinforced with felted strands or fibers of oxidized cellulose to provide strength and resiliency to the disc. Use can also be made of a regenerated collagen which can be made more rigid and strong by being chromicized. Suitable also are such materials as stiffened animal parchment, cat gut or the like, preferably in the form of sheep intestine incised along the major axis and flattened after the mucosa has been removed, and then cut into ribbons which can be hardened and stiffened by being chromicized to enable the discs to be stamped therefrom. Other materials include polymers of amino acids such as casein, albumins and the like, or polyhydric alcohol polymers. While it is preferred to make use of a disc formed of an absorbable or soluble material, materials not fully absorbed can be used if the disc member is of small enough dimension, and thin enough.

In the modification shown in FIGURES 1 and 2, the split disc is fabricated of a strip formed of a single layer with a slit 12 extending continuously crosswise thereof. In the modification shown in FIGURES 3 to 5, a tongue 20 and groove 22 arrangement is provided for more effective and lasting strangulation of the blood vessel. In this modification, the slit 12 does not extend continuously crosswise of the disc member, but instead is formed with a tongue 20 in the mid-section along one edge and a corresponding groove 22 in the opposite edge whereby the tongue is adapted to be received in fitting relationship within the groove to grip the blood vessel more tightly therebetween. The latter construction can most expediently be produced by fabricating the disc member of three or more plies 24, 26, and 28, assembled to set out the edges of alternate plies to form a groove therebetween and whereby the intermediate plies provide the tongue in the opposite edge. As previously pointed out, the body portion of the disc member can be formed with corrugations to increase its stiffness and strength with minimum thickness, and the meeting edges along the slit can be corrugated for enabling a better gripping relationship to be effected.

In use, the blood vessel 30 is gripped adjacent the tissue bed 31 with a hemostat forcep 32 to stop bleeding, as illustrated in FIGURE 2. In the preferred practice, the hemostat forcep is then rotated about the blood vessel as the axis to twist the blood vessel in a manner to cause torsion and corresponding reduction in the diameter thereof, as illustrated in FIGURE 8. Such twisting and torsion operates not only to form the blood vessel into a narrow tube 34 but it also tends to introduce stiffness into the twisted unit which enables the split disc 10 to be displaced flatwise beneath the hemostat onto the twisted blood vessel as the blood vessel is displaced endwise into the slit 12. Upon release, the split disc continues to strangulate the blood vessel until healed to prevent the loss of blood therefrom. It will be understood that the disc can be inserted beneath the forcep to strangulate the vessel without twisting.

The pastille is improved when the split disc is dusted with a powdered gelatin and delivered dry and ready for use in sterile packages. The gelatin powder functions as a blood coagulant which tends to stop oozing in the immediate area of the ligature.

The concept described can operate materially to improve upon the relatively archaic methods for typing ligatures. The disc members described can be supplied for use with special cleft thumb forceps with flattened blades preloaded with a disc and with a number of forceps loaded and ready for use upon the Mayo stand. The discs can be made available in large numbers stacked with a dispenser for use or for loading in dispenser forceps.

It will be apparent that very little time is required to slip the split disc about the blood vessel by comparison with the time necessary to ligate with a knot-tying technique. It is estimated that the disc can strangulate the ligature in a fraction of the time required to tie the desired knots, thereby materially to save upon the loss of blood and effort required to ligate. The effectiveness of the disc is substantially immediate for strangulation of the vessel, and its effectiveness increases as the pressure on the blood vessel is increased in response to the swelling which takes place as moisture is taken up in the material of which the disc is formed.

It is preferred to make use of a disc that is formed with flat faces in order to minimize the ability of the disc to be rocked in position of use. Such rocking movement might cause the disc to walk off the vessel or else open the slit to enable release thereof. When formed flat, the face of the disc lies against the flat bed of tissue at the base from which the vessel protrudes to prevent rocking movement.

It will be apparent from the foregoing that I have provided a simple and inexpensive disc member which can be easily and quickly slipped over a small, available section of a blood vessel for efficiently and effectively strangulating the vessel immediately to stop the bleeding thereof.

It will be understood that changes may be made in the details of construction, arrangement and operation without departing from the spirit of the invention, especially as defined in the following claims.

I claim:
1. A blood vessel ligature clip for the strangulation of blood vessels comprising a unitary flat disc formed of at least three layers laminated in superposed relation and a slit extending lengthwise in each of said layers from a curvilinear entrant portion at the leading edge to a distance short of the trailing edge with the slit in alternate layers being offset slightly laterally from the slits in adjacent layers thereby to provide an interfitting groove and tongue arrangement therebetween.

2. A clip as claimed in claim 1 in which the disc layers are formed of a material which is slowly absorbable in the body fluids.

References Cited in the file of this patent
UNITED STATES PATENTS

| | | |
|---|---|---|
| 107,952 | Osborn | Oct. 4, 1870 |
| 870,544 | Churchill | Nov. 12, 1907 |
| 1,635,835 | Good | July 12, 1927 |
| 1,918,889 | Bacon | July 18, 1933 |
| 1,940,351 | Howard | Dec. 19, 1933 |
| 2,108,325 | Ziegler | Feb. 15, 1938 |
| 2,123,890 | Gossrau | July 19, 1938 |
| 2,287,335 | Yven | June 23, 1942 |
| 2,503,327 | Fields | Apr. 11, 1950 |
| 2,568,389 | Elliot | Sept. 18, 1951 |
| 2,598,901 | Garland | June 3, 1952 |
| 2,748,774 | Novak | June 5, 1956 |